United States Patent [19]

Kawasaki

[11] 3,864,565

[45] Feb. 4, 1975

[54] LIGHT AMOUNT INTEGRATION MEANS

[75] Inventor: Masahiro Kawasaki, Tokyo, Japan

[73] Assignee: Asahi Kogaku Kogyo Kabushiki Kaisha, Tokyo, Japan

[22] Filed: Sept. 13, 1973

[21] Appl. No.: 396,894

[30] Foreign Application Priority Data

Sept. 21, 1972 Japan .............................. 47-109952

[52] U.S. Cl. ................................ 250/214 P, 354/23

[51] Int. Cl. ............................................ H01j 39/12

[58] Field of Search ............ 250/214 R, 214 P, 205; 95/10 R, 10 C, 10 CD, 10 CT, 10 CE

[56] References Cited

UNITED STATES PATENTS

| | | | |
|---|---|---|---|
| 3,442,190 | 5/1969 | Erickson | 95/10 CT |
| 3,563,143 | 2/1971 | Petersen | 95/10 CT |
| 3,568,582 | 3/1971 | Uchida | 250/205 |
| 3,602,717 | 8/1971 | Konig | 95/10 CT |
| 3,657,979 | 4/1972 | Nobusawa | 95/10 CT |
| 3,673,415 | 6/1972 | Yoshimura | 250/214 P |
| 3,678,826 | 7/1972 | Mori | 95/10 CT |
| 3,691,917 | 9/1972 | Uchida | 95/10 CT |
| 3,712,192 | 1/1973 | Ono | 95/10 CT |
| 3,736,851 | 6/1973 | Ono | 95/10 CT |

*Primary Examiner*—James W. Lawrence
*Assistant Examiner*—D. C. Nelms
*Attorney, Agent, or Firm*—Christie, Parker & Hale

[57] ABSTRACT

A light receiving element is operative to provide an electrical signal representing the amount of light it is receiving. The element is connected between the source and gate of a grounded-gate field effect transistor having its drain connected to provide current to a storage capacitor. A switching element connected to the source controls a charging operation whereby current provided to the capacitor develops across the capacitor a voltage proportional to the integral of the current and thereby also proportional to the amount of light received over a specific time duration.

3 Claims, 4 Drawing Figures

LIGHT AMOUNT INTEGRATION MEANS

BACKGROUND OF THE INVENTION

In general, this invention relates to light measuring and indicating techniques. More particularly, it relates to apparatus providing an electrical signal proportional to the integral of the amount of light received over a specific time duration.

It has heretofore been proposed to integrate photo current for the purpose of developing a signal indicative of light amount. In a conventional technique, a transistor grounded base circuit is provided. With such a circuit, it is necessary to employ a photovoltaic element as a light receiving element. Also there is the following significant disadvantage in performance characteristic. In a relatively low illumination range, owing principally to the threshold voltage incident to the emitter-base junction characteristic, the linear transformability of the light-transformation information and light response are lowered.

SUMMARY OF THE INVENTION

The apparatus of this invention includes a light receiving element. An advantage of this invention is that either a photovoltaic element or a photo diode can be used. The apparatus further includes a grounded-gate field effect transistor and a storage capacitor connected to the drain of the field effect transistor. The light receiving element is connected between the source and the gate of the field effect transistor. A switching element connected to the source controls a charging operation. During the charging operation, the field effect transistor operates as a closed switch coupling photocurrent to the capacitor whereby through integration there is developed a voltage signal. An advantage of the field effect transistor relates to its high cut off resistance when switched out of conduction. Thus, the capacitor voltage is not quickly discharged but instead the capacitor effectively serves as a memory. Significant too is the more linear performance in contrast to the above-described conventional technique.

DETAILED DESCRIPTION

Figure 1A:
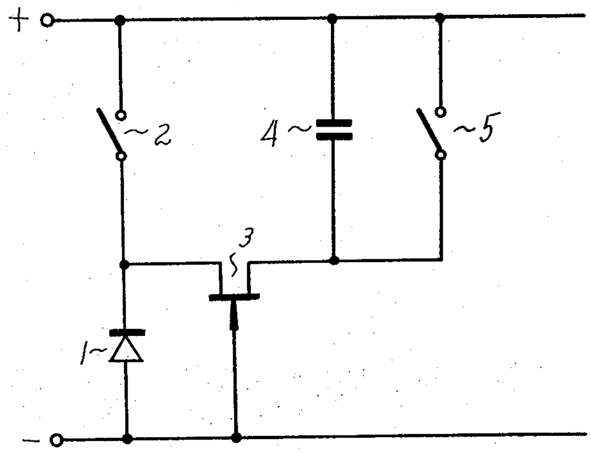
FIG. 1 comprises FIGS. 1(a), 1(b), and 1(c) which respectively show a circuit diagram of one embodiment of apparatus according to this invention, a graph showing the characteristic curve of the operative element of this circuit, and a graph illustrating the overall operation of the apparatus.
Figure 1B:
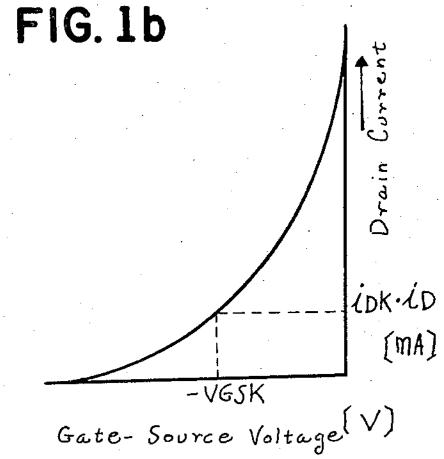

In FIG. 1(a) there are shown a photo diode 1, a field effect transistor 3, an integration capacitor 4, an integration stop switch 2, and an integration reset switch 5. In one condition of the circuit the switches 2 and 5 are both open. In this condition, the photo diode 1 receives light and in response provides photocurrent $i_p$ in an amount determined by the amount of light received. Then, the drain current $i_{DK}$ of the field effect transistor 3 is: $i_{DK} = i_p$. From the characteristic as shown in FIG. 1(b), a reverse bias voltage $V_{GSK}$ is thus applied to the photo diode 1. Here, the load resistance presented across the photo diode 1 is the grounded-gate input impedance of the field effect transistor 3. The load resistance R is in low frequencey range. R = 1/gm (gm: mutual conductance of FET). The current ($i_{DK}$) provided to the capacitor develops across the capacitor a voltage proportional to the integral of the current and thereby also proportional to the amount of light received over the time duration that the switches are both open.

Figure 1C:
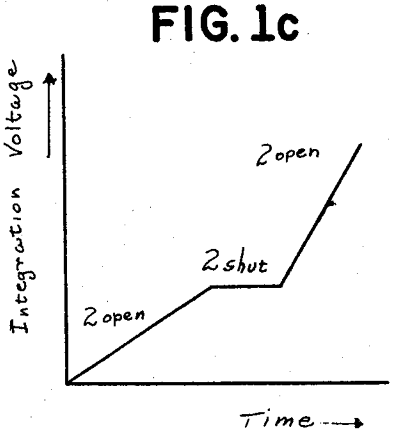

When the switch 2 is closed, the source voltage of the field effect transistor 3 rises and the gate source potential becomes more than $V_p$ ($V_p$: pinch off voltage), so that the transistor 3 becomes non-conductive. Therefore, its drain current does not flow and further integration does not take place. Thus, as shown in FIG. 1(c), opening of the switch 2 starts integration and closure of the switch 2 stops integration, thereby accomplishing integration for desired time duration. Owing to the high cut-off resistance of the field effect transistor, the voltage across the capacitor is not quickly discharged. Instead, the capacitor effectively serves as a memory until such time as the reset switch 5 is closed.

Figure 2:
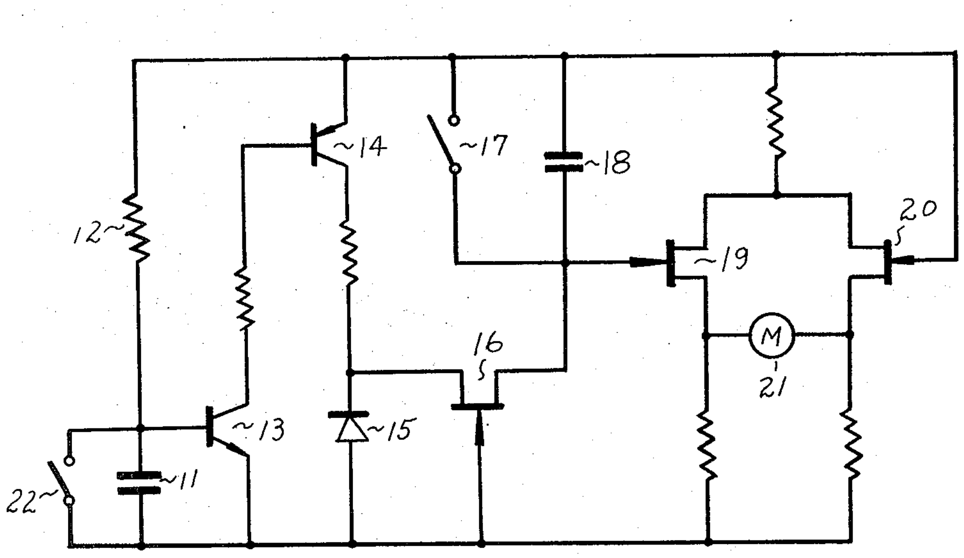
FIG. 2 is a circuit diagram of another embodiment of the apparatus of this invention.

In FIG. 2 there is shown apparatus particularly adapted for use in connection with flash photography. The apparatus of FIG. 2 receives flash light and memorizes and indicates the amount of the received light. In FIG. 2 there are shown a capacitor 11 which in combination with a resistor 12, has a predetermined time constant. Also shown are transistors 13 and 14 which are switched in accordance with the time constant, a photo diode 15, a field effect transistor 16, an integration capacitor 18, field effect transistors 19 and 20 constituting a differential amplifier, a meter 21, and integration capacitor reset switches 17 and 22.

In operation, the switches 17 and 22 are caused to be opened by conventional means (not shown) in synchronism with flash light. The transistors 13 and 14 remain non-conductive during a delay interval lasting until the potential of the capacitor 11 reaches the threshold level of the transistor 13. During the delay interval, the photocurrent from the photo diode 15 charges the capacitor 18 through the field effect transistor 16. At the end of the delay interval, when the potential of the capacitor 11 reaches a value which makes the transistor 13 conductive, the next-stage transistor 14 becomes also conductive. Thus it can be seen that transistor 14 is a switching element performing substantially the same function as the mechanical switch 2 of FIG. 1(a). The source potential of the field effect transistor 16 rises upon transistor 14 becoming conductive so that this transistor 16 becomes non-conductive. Accordingly, the photocurrent does not flow into the capacitor 18 and its potential is memorized. This potential, that is, the integrated amount of received light, is indicated by the differential amplifier 19, 20.

Preferably the arrangement is so made that said time constant is equal to the flash time duration; therefore, it is possible to prevent charging by natural light.

Since, as mentioned above, according to the present invention, integration of the photocurrent owing to the light receiving element is made through a field effect transistor, the response is quick, good linearity is obtained in low illumination range, and memorization of light amount of only desired time duration can be carried out. As a field effect transistor is employed as a switching element, there are no drawbacks such as the delay incident to use of a relay or the lowness of cut-off resistance of a junction transistor.

What is claimed is:

1. Apparatus for measuring and indicating light amount, which comprises a field effect transistor having a source, a gate, and a drain, and arranged in a grounded-gate circuit configuration; a light receiving element which is connected between the gate and the source and which develops a signal proportional to the amount of light it is receiving; a capacitor connected to be charged by current flowing through the field effect transistor, and a switching element connected to the source of the field effect transistor for controlling a charging operation in which said signal causes current to flow through the field effect transistor to charge the capacitor across which there is developed a voltage proportional to the integral of the current and thereby also proportional to the amount of light received over a specific time duration.

2. Apparatus according to claim 1 wherein the light receiving element is a photo diode.

3. Apparatus according to claim 1 wherein the switching element is a junction transistor, and wherein the apparatus further includes a switch and a timing circuit for controlling the switching into conduction of the junction transistor so that there is a predetermined delay between the operation of the switch and switching of the junction transistor.

* * * * *